United States Patent [19]

Yoshimura et al.

[11] Patent Number: 5,751,478
[45] Date of Patent: May 12, 1998

[54] REAR-PROJECTION SCREEN

[75] Inventors: Osamu Yoshimura; Ichiro Matsuzaki, both of Niigata, Japan

[73] Assignee: Kuraray Co., Ltd., Kurashiki, Japan

[21] Appl. No.: 626,966

[22] Filed: Apr. 3, 1996

[30] Foreign Application Priority Data

Apr. 6, 1995 [JP] Japan .................................. 7-080944

[51] Int. Cl.$^6$ .......................... G03B 21/60; G02B 13/20; G02B 3/08
[52] U.S. Cl. .......................... 359/453; 359/457; 359/460; 359/707; 359/742
[58] Field of Search .................. 359/457, 453, 359/460, 707, 742

[56] References Cited

U.S. PATENT DOCUMENTS

| | | | |
|---|---|---|---|
| 3,712,707 | 1/1973 | Henkes, Jr. ........................ | 359/448 |
| 5,432,636 | 7/1995 | Ishii et al. . | |
| 5,457,572 | 10/1995 | Ishii et al. ........................ | 359/457 |
| 5,477,380 | 12/1995 | Watanabe et al. ................ | 359/457 |

FOREIGN PATENT DOCUMENTS

| | | |
|---|---|---|
| 7 134338 | 5/1995 | Japan . |
| 2 235 990 | 3/1991 | United Kingdom . |

OTHER PUBLICATIONS

Patent Abstracts of Japan, vol. 18, No. 621 (P-1832), Nov. 25, 1994, JP-A-06 235976, Aug. 23, 1994.
Patent Abstracts of Japan, vol. 7, No. 196 (P-219), Aug. 26, 1983, JP-A-58 093043, Jun. 2, 1983.

*Primary Examiner*—Frank G. Font
*Assistant Examiner*—Evelyn A. Lester
*Attorney, Agent, or Firm*—Oblon, Spivak, McClelland, Maier & Neustadt, P.C.

[57] ABSTRACT

A rear-projection screen having at least a Fresnel lens and a light-diffusing member, and is characterized by having vertical-direction light diffusion properties greater at its upper and lower end portions than at its middle portion. For example, the light-diffusing member contains light-diffusing fine particles and has a vertical lenticular lens that diffuses light in the vertical direction, provided on the light-incident surface of the Fresnel lens. This decreases the rainbows caused by misdirected light and also improves the brightness at the border, without causing a lowering of peak gain.

7 Claims, 5 Drawing Sheets

REAR-PROJECTION SCREEN

BACKGROUND OF THE INVENTION

1. Field of the Invention

This invention relates to a rear-projection screen comprised of at least a Fresnel lens and a light-diffusing member such as a lenticular lens.

2. Description of the Related Art

Screens comprised of a Fresnel lens and a light-diffusing member such as a lenticular lens are conventionally used in rear-projection type televisions. In such screens, the Fresnel lens has the function to converge projected light rays toward the viewer, and the light-diffusing member has the function to diffuse projected light rays emergent from the Fresnel lens, to provide a required viewing scope. In the rear-projection type televisions, it is commonly required for pictures to be viewed in a wide scope in the horizontal direction, and hence a light-diffusing member provided with a lenticular lens that refracts light in the horizontal direction is used.

The scope of a visual field in the horizontal direction is expanded chiefly by the refraction-ability of the lenticular lens, and the scope of a visual field in the vertical direction is expanded by the scattering-ability of light-diffusing fine particles contained in the lenticular lens, and hence the scope of a visual field in the vertical direction is very narrower than the scope of a visual field in the horizontal direction. In order to expand this scope of a visual field, the concentration of light-diffusing fine particles in the lenticular lens must be increased, causing a lowering of peak gain (brightness of the screen) which is one of typical properties of the screen.

Moreover, the Fresnel lens has the structure wherein it has a flat surface on the incident side and has a lens surface on the emergent side with minute prisms continuously arranged, and hence ghost light which is not emergent in the direction of a viewer may occur in the lens sheet, causing undesirable light called colored rings (what is called "rainbows").

As methods for expanding the scope of a visual field in the vertical direction and also decreasing the undesirable light called rainbows, caused by the ghost light that occurs in the Fresnel lens, development has been made on techniques in which, e.g., horizontal-direction hair lines are formed on the back of the Fresnel lens (see Japanese Patent Application Laid-open No. 59-119341) and a vertical light-diffusing lenticular lens is provided on the back of the Fresnel lens (see Japanese Patent Application Laid-open No. 58-93043).

These methods can control the visual angle in the vertical direction or can decrease the undesirable light called rainbows, but have necessarily caused a decrease in the peak gain. An attempt to decrease the concentration of light-diffusing fine particles in the light-diffusing member in order to keep this peak gain has caused a lowering of image quality, which occurs as an increase in the moire that occurs by interference between the Fresnel lens and the lenticular lens, a decrease in brightness at the border of the screen and an increase in color shift. Moreover, recently, as rear-projection type televisions have been made more compact, the difficulties as stated above tend to more occur.

SUMMARY OF THE INVENTION

The present invention will solve the problems involved in the prior art. An object of the invention is to provide a rear-projection screen that can decrease the rainbows, improve the brightness at the border and prevent the color shift, without causing a lowering of peak gain.

The present inventors have discovered that, in order to achieve the above object, it is effective to make the screen have light-diffusing properties greater at its upper and lower end portions than at its middle portion, and have accomplished the present invention.

That is, the rear-projection screen of the present invention that can solve the problems discussed above is a rear-projection screen comprising a Fresnel lens and a light-diffusing member, wherein the screen has light diffusion properties greater at its upper and lower end portions than at its middle portion.

In particular, the rear-projection screen of the present invention embraces an embodiment that it comprises a Fresnel lens and a light-diffusing member, wherein the light-diffusing member contains light-diffusing fine particles as a means for diffusing light in the vertical direction, and also an embodiment that it comprises a vertical lenticular lens that diffuses light in the vertical direction, wherein the vertical lenticular lens has vertical-direction light diffusion properties greater at its upper and lower end portions than at its middle portion.

In the above rear-projection screen of the present invention, the middle portion of the screen is meant to be preferably the portion having an extent which is within 15% in the height direction from the mechanical center of the Fresnel lens of the rear-projection screen, and the upper and lower end portions are meant to be the portions each having an extent which is 70% outward in the height direction from the mechanical center of the Fresnel lens. Between the middle portion and the upper and lower end portions, the diffusion properties in the vertical direction may preferably be made gradually greater. The mechanical center of the Fresnel lens is meant to be the point at which the diagonal lines of the Fresnel lens intersect.

DETAILED DESCRIPTION OF THE INVENTION

Figure 1:
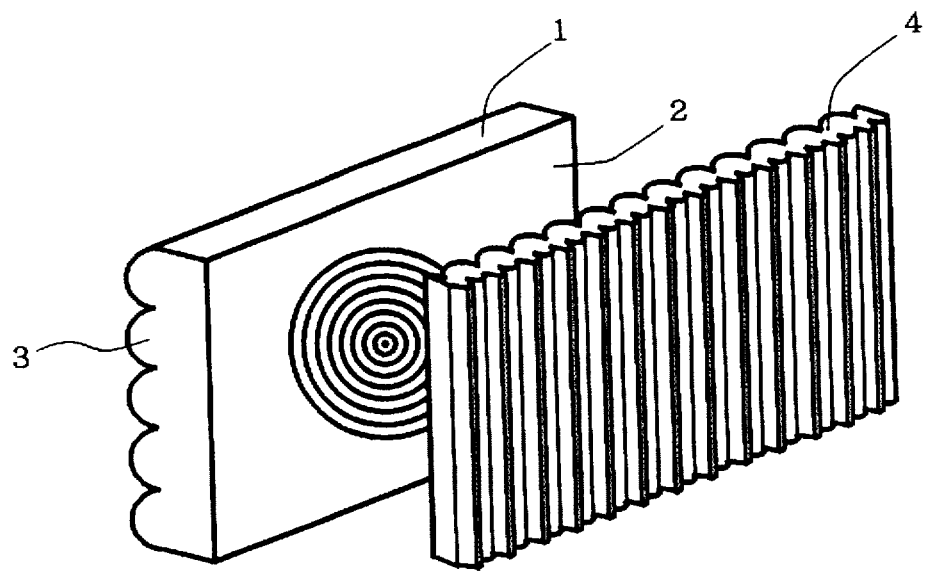
FIG. 1 is a schematic view of the rear-projection screen according to the present invention.

In the present invention, the light-diffusing member refers to a member containing light-diffusing fine particles or capable of diffusing light because of fine ruggedness formed on its surface, and may have the shape of a flat plate, an embossed sheet or a lenticular lens sheet, any of which may be employed.

As methods for making light diffusion properties greater at the upper and lower end portions of the screen than at the middle portion thereof, they may include a method in which such properties are imparted to the screen by the use of the light-diffusing member, a method in which the properties are imparted thereto by the use of a Fresnel lens sheet, a method in which the light-diffusion properties are imparted thereto by providing a sheet other than the light-diffusing member and Fresnel lens sheet. For example, as the method of making the light diffusion properties greater at the upper and lower end portions than at the middle portion by the use of the light-diffusing member, the concentration of the light-diffusing fine particles at the upper and lower end portions may be made higher than at the middle portion. As the method of making the light diffusion properties greater at the upper and lower end portions than at the middle portion by the use of a Fresnel lens sheet, a vertical lenticular lens capable of diffusing light in the vertical direction may be integrally formed on the back of the Fresnel lens, and the light diffusion properties of this vertical lenticular lens may be made greater at the upper and lower end portions than at the middle portion. As the method of making the light diffusion properties greater at the upper and lower end portions than at the middle portion by the use of a sheet other than the light-diffusing member and Fresnel lens sheet, a vertical lenticular lens capable of diffusing light in the vertical direction may be formed on one side of such a sheet, and the light diffusion properties of this vertical lenticular lens may be made greater at the upper and lower end portions than at the middle portion. In particular, in the case when the vertical lenticular lens capable of diffusing light in the vertical direction is integrally formed on the back of the Fresnel lens sheet, it is preferable to set constant the pitch of the lenticular lens and form the lenticular lens in the manner that the height of hill of individual cylindrical lenses constituting the lenticular lens is made higher at the upper and lower end portions than at the middle portion, or to set constant the height of hills of the lenticular lens and form the lenticular lens in the manner that the pitch thereof is made smaller at the upper and lower end portions than at the middle portion, or to form the lenticular lens in the manner that the pitch thereof is made smaller at the upper and lower end portions than at the middle portion and the height of hill of individual cylindrical lenses constituting the lenticular lens is made higher at the upper and lower end portions than at the middle portion.

Since the rear-projection screen of the present invention has the light diffusion properties made greater at the upper and lower end portions of the screen than at the middle portion thereof, the brightness at the border of the screen can be improved without causing a lowering of peak gain. Since also the light diffusion properties of the screen are made greater at the upper and lower end portions where the rainbows occur, the degree of coloring of the rainbows can be made lower and the region of coloring can be made smaller. Moreover, since the light-diffusing member has greater light diffusion properties, the color shift can be better prevented.

The present invention will be specifically described below by giving examples.

FIG. 1 schematically illustrates the rear-projection screen of the present invention. As shown in FIG. 1, this screen is comprised of a Fresnel lens 1 and a lenticular lens 4. The Fresnel lens 1 is constituted of a Fresnel lens surface 2 and a vertical lenticular lens 3 that diffuses light in the vertical direction, provided on the back of the Fresnel lens.

Figure 2:
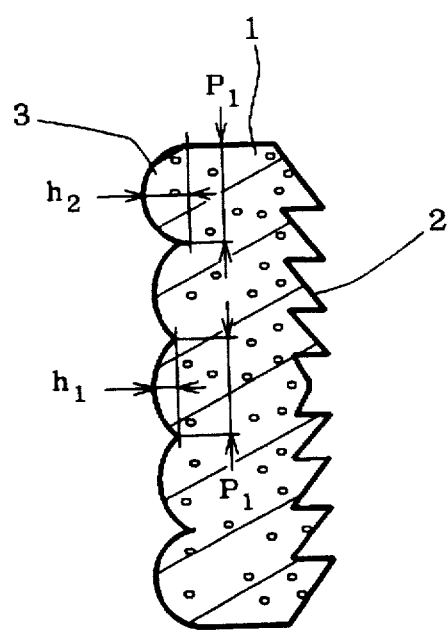
FIG. 2 is a cross section of an example of the Fresnel lens used in the present invention.

FIG. 2 cross-sectionally illustrates the Fresnel lens used in the present invention. The Fresnel lens 1 is provided on the back thereof with the vertical lenticular lens 3. This vertical lenticular lens 3 has a pitch $P_1$ of hills which is constant at both the middle portion and the upper and lower end portions of the screen, but the height of hills is made greater at the upper and lower end portions, i.e., $h_1 < h_2$. As a method for providing such a distribution in hill height, it can be exemplified by the following: When the sheet that serves as the substrate of the Fresnel lens is formed by extrusion, a roll provided with grooves with the same pitch and the same depth is used as a roll for shaping the material into the lenticular lens, and, when extruded, the quantity of a bank (a resin standing between extrusion rolls) is made smaller at the middle of the roll, corresponding to the middle portion of the Fresnel lens substrate, and the quantity of the bank is made larger at the both ends of the roll, corresponding to the upper and lower end portions.

Figure 3:
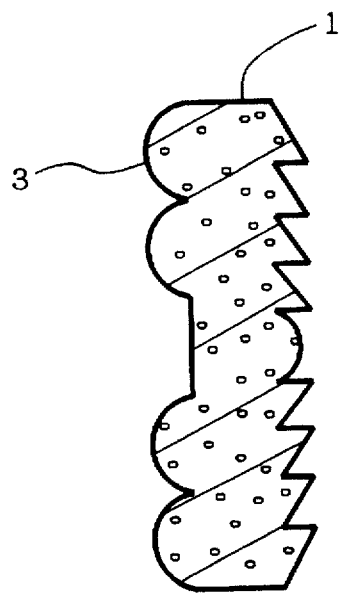
FIG. 3 is a cross section of another example of the Fresnel lens used in the present invention.

FIG. 3 cross-sectionally illustrates another example of the Fresnel lens used in the present invention. The Fresnel lens 1 is provided on the back thereof with the vertical lenticular lens 3, but is made up in the manner that the vertical lenticular lens is absent at the middle portion of the screen. In these Fresnel lens sheets having the forms as shown in FIGS. 2 and 3, the height of hills of the vertical lenticular lens is made greater at the upper and lower end portions of the screen than at the middle portion thereof, bringing about the feature that the light diffusion properties are greater at the border of the sheets.

Figure 4:
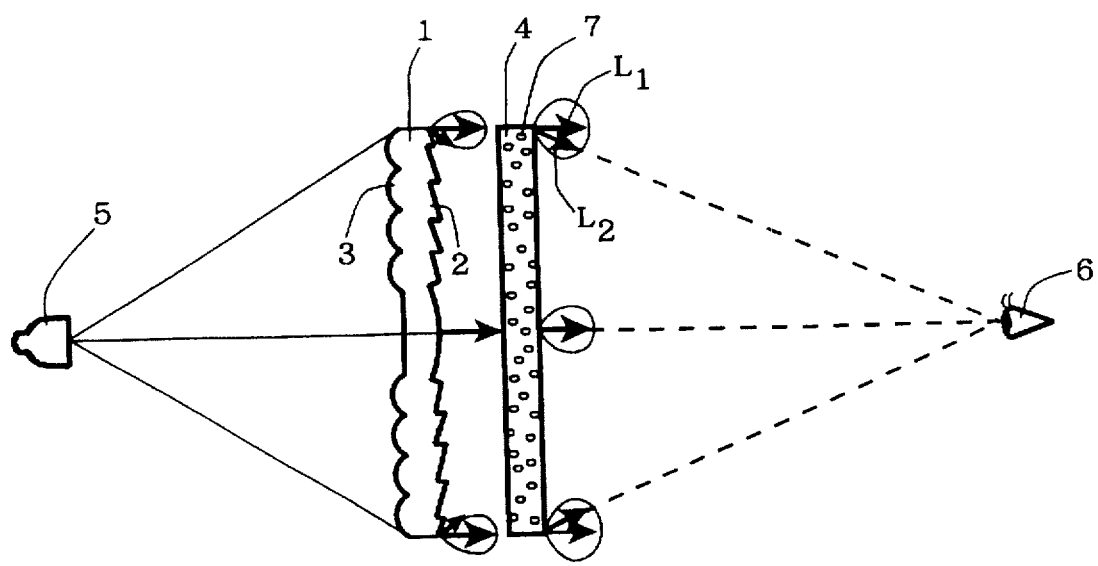
FIG. 4 illustrates the course of light rays passing through the screen of the present invention.

FIG. 4 illustrates the course of light rays to show the intensity of light and the direction in which the light diffuses, in the case when the screen of the present invention is used. The light rays emitted from a light source 5 is incident on the Fresnel lens 1. Here, the vertical lenticular lens is absent at the middle portion of the screen, and hence the light does not diffuse and reaches the light-diffusing member 4 such as the lenticular lens. Now, when a viewer at the front of the screen intends to obtain the desired peak gain, assume that the light-diffusing fine particles 7 that can be incorporated into the light-diffusing member 4 are in a concentration of A% and the light-diffusing member 4 contains A% of the light-diffusing fine particles 7. At the upper and lower end portions of the screen, the vertical lenticular lens 3 is provided, where the light, after it has been diffused, is refracted at the Fresnel lens 2, and reaches the light-diffusing member 4. Since the light-diffusing fine particles 7 are included in the light-diffusing member 4 in a concentration of A%, the light is further diffused and reaches the viewer.

Figure 5:
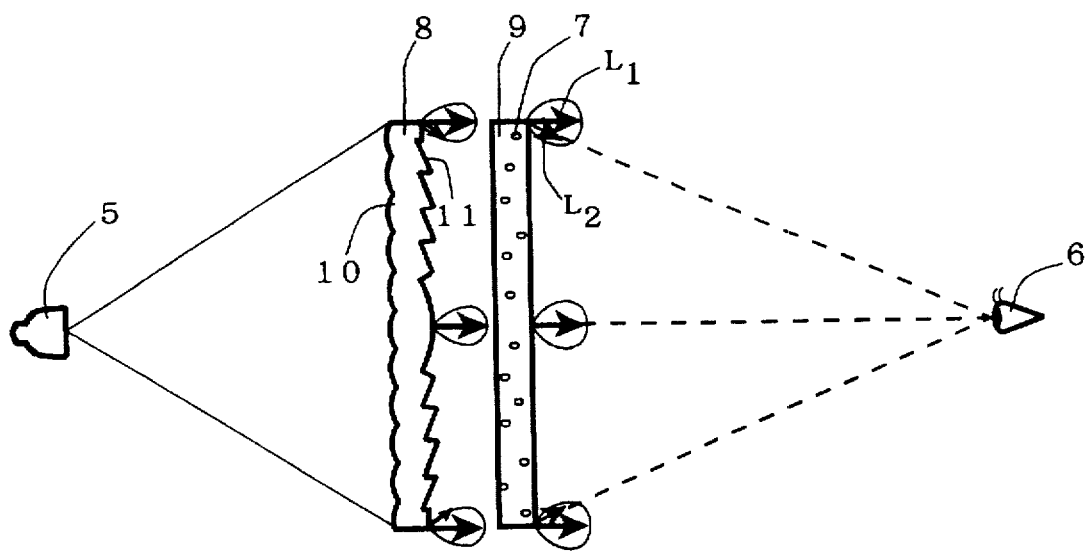
FIG. 5 illustrates the course of light rays passing through the conventional screen.

Meanwhile, FIG. 5 illustrates the course of light rays to show the intensity of light and the direction in which the light diffuses, in the case when the conventional screen is used. The light rays emitted from a light source 5 is incident on a Fresnel lens 8. On the back of the Fresnel lens, a vertical lenticular lens 10 is provided which has the same height of hills throughout the middle portion of the screen and the upper and lower end portions of the screen. Hence, the light is diffused by the vertical lenticular lens 10 at the middle portion of the screen, and reaches a light-diffusing member 9 while causing a decrease in the intensity of the light that travels toward the front of the screen, i.e., the direction where the peak gain is measured. Now, when it is attempted to obtain the same peak gain as that of the screen of the present invention, the light-diffusing fine particles 7 that can be incorporated into the light-diffusing member 4 is in a concentration of B%. Thus, assume that the light-diffusing member 9 contains B% of the light-diffusing fine particles. To compare the concentration of the light-diffusing fine particles incorporated into the light-diffusing member 4 used in the present invention with that of those in the light-diffusing member 9 used in the conventional screen, the relationship of A>B is established. In the conventional screen as shown in FIG. 5, the vertical lenticular lens 10 having the same height of hills is provided so as to be present also at its middle portion, where the light, after it has been diffused, is refracted at the Fresnel lens surface 11, and reaches the light-diffusing member 9. Since the light-diffusing fine particles 7 are included in the light-diffusing member 4 in a concentration of B%, the light is further diffused and reaches the viewer. However, as stated above, to compare the concentration A of the light-diffusing fine particles 7 incorporated into the light-diffusing member 4 in the screen of the present invention with the concentration B of the light-diffusing fine particles 7 in the light-diffusing member 9, the relationship of A>B is established. Hence, the screen of the present invention has greater light diffusion properties than the conventional screen of FIG. 5, at the upper and lower end portions of the screen. Hence, in the screen of the present invention, a ratio $L_2$ to $L_1$ at the upper and lower end portions of the screen, where $L_2$ is an intensity of light directed toward the viewer 6 and $L_1$ is an intensity of light emergent to the normal direction of the screen surface, is greater than that of the conventional screen of FIG. 5, so that the screen looks bright at the border when the border of the screen is viewed from the normal direction of the screen surface.

The screen making use of the Fresnel lens sheet 1 having the form shown in FIG. 2, 3 or 4 as described above, makes use of a Fresnel lens sheet whose vertical lenticular lens has a height of hills which is greater at the upper and lower end portions of the screen than at the middle portion thereof. Hence, the light-diffusing fine particles 7 can be incorporated in the light-diffusing member 4 at a higher concentration when the stated peak gain is to be obtained, and hence the brightness at the border can be increased. The present screen has such characteristic features.

Figure 6:
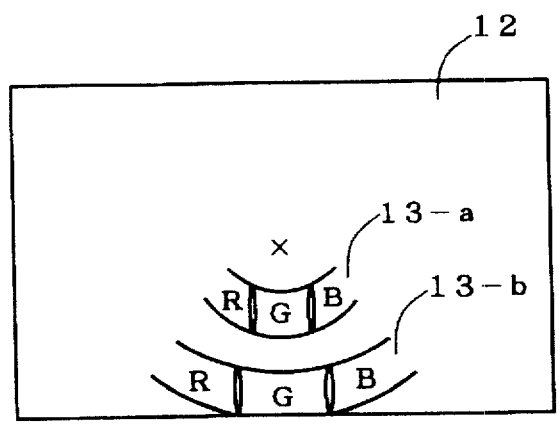
FIG. 6 illustrates how the rainbows occur.
Figure 7:
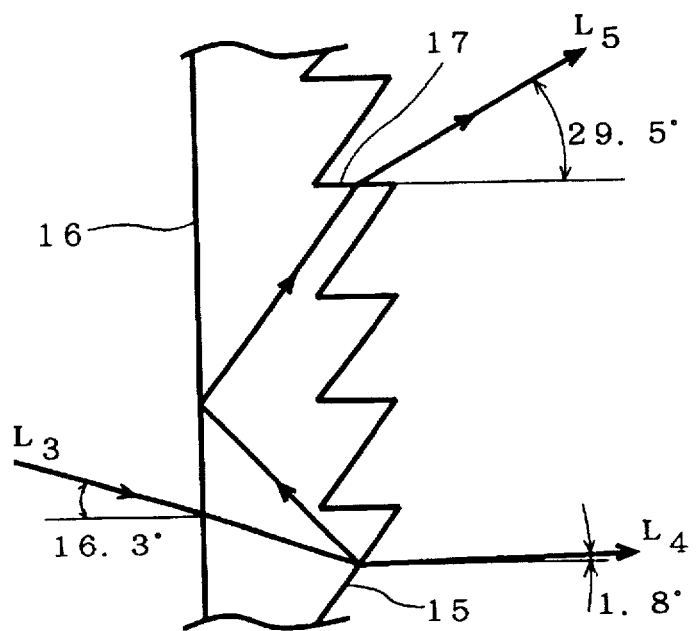
FIG. 7 illustrates the course of light rays to analyze the cause of the rainbows.

Secondly, when the screen of the present invention is used, the undesirable light called rainbows can be decreased. FIG. 6 shows how a conventional screen looks when it is installed to a rear-projection type television, white raster signals are inputted thereto, and the screen is viewed at the position 1.5 m distant from the screen. A rainbow 13-$a$ colored in red, green and blue appears in an arc at the position about 70% from the center of a white screen 12 toward its lower end. FIG. 7 illustrates the course of light rays to analyze the cause of this rainbow, and shows the light path of regular light and the undesirable light causing the rainbow, at a position of 220 mm from the center of the screen toward its lower end (the position of 70% from the center of the screen toward its lower end). To make the description simple, the results of only green light rays are shown in this drawing. Light rays $L_3$ incident on the Fresnel lens at an angle of 16.3° are refracted at the Fresnel lens surface 15 and are upward emergent as regular light $L_4$ at an angle of 1.8°. However, part of the light rays are regularly reflected at the Fresnel lens surface 15 and travel in the direction shown by an arrow, where they are totally reflected at the back 16 of the Fresnel lens and are emergent as undesirable light $L_5$ from a rise surface 17 in an upward direction of 29.5°. This is the light rays that cause the rainbow 13-$a$. In FIG. 7, the Fresnel lens back 16 is illustrated as a flat surface in order to make the description simple. In practice, however, the vertical lenticular lens is provided on this surface in some cases. Thus, the diffusion occurs when the incident light enters from the back of the Fresnel lens and also when the light rays reflected from the Fresnel lens surface are totally reflected at the back of the Fresnel lens, so that the rainbow spreads out in the height direction and also the light intensity becomes weak.

When the screen of the present invention is used, the light-diffusing fine particles can be incorporated in the light-diffusing member at a higher concentration than in the case of conventional screens to obtain the same peak gain, and hence the undesirable light emergent from the Fresnel lens can be more strongly scattered, so that the intensity of the rainbow 13-$a$ can be greatly decreased.

Figure 8:
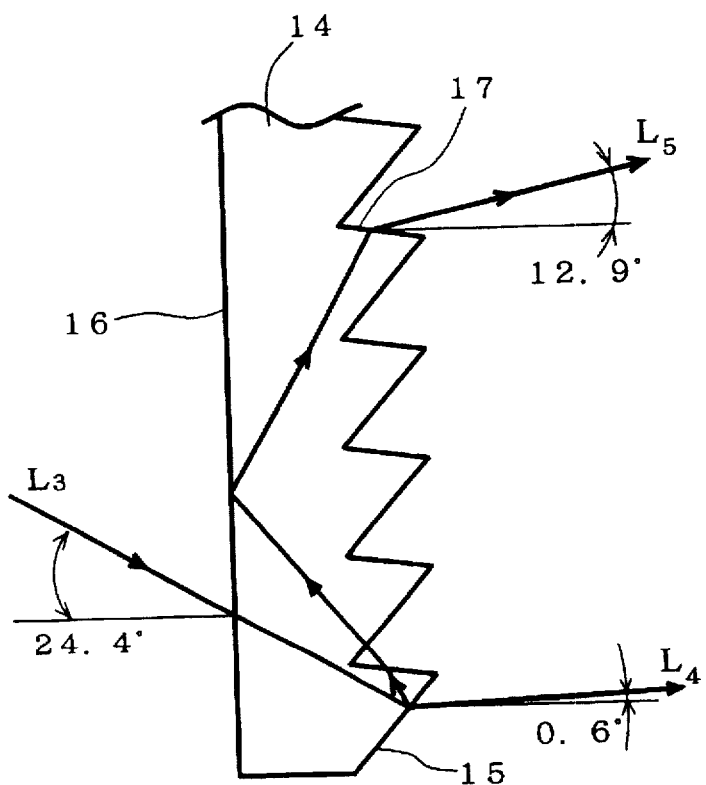
FIG. 8 illustrates the course of light rays to analyze the cause of rainbows occurring at the lower end of the screen.

With regard to a rainbow 13-$b$ that appears at the lower end of the screen as shown in FIG. 6, FIG. 8 illustrates the course of light rays to analyze the cause of this rainbow, and shows the light path of regular light and the undesirable light causing the rainbow, at the position of 310 mm from the center of the screen toward its lower end (the position endmost from the center of the screen vertically toward the lower end of the screen). To make the description simple, the results of only green light rays are shown in this drawing. Light rays $L_3$ incident on the Fresnel lens at an angle of 24.4° are refracted at the Fresnel lens surface 15 and are upward emergent as regular light $L_4$ at an angle of 0.6°. However, part of the light rays are regularly reflected at the Fresnel lens surface 15, emergent from a rise surface 17, and again incident on the Fresnel lens surface 15. Thereafter, they are totally reflected at the back 16 of the Fresnel lens and are emergent as undesirable light $L_5$ from other rise surface 17 in an upward direction of 12.9°. This is the light rays that cause the rainbow 13$b$. In FIG. 8, like FIG. 7, the Fresnel lens back is, in practice, provided with the vertical lenticular lens on the back thereof.

Here, when the screen of the present invention is used, the vertical lenticular lens has higher hills at the upper and lower end portions, and hence the undesirable light $L_5$ can be further scattered, so that the intensity of the rainbow 13-$b$ can be decreased. In rear-projection type televisions commonly available, the rainbow 13-$a$ appears at the position about 70% from the center of the screen toward its lower end. On the basis of this fact, a preferable extent of the upper and lower end portions as referred to in the present invention is on the outside of 70% in the height direction from the mechanical center of the Fresnel lens. With regard to this extent, the vertical lenticular lens has greater light diffusion properties in its vertical direction, and hence the rainbow can be more decreased.

A preferable extent of the middle portion of the screen as referred to in the present invention is within a range of 15% in the height direction from the mechanical center of the Fresnel lens. Rear-projection type televisions are often directly placed on the floor. Hence, viewers often watch televisions as if they look down the screen. In order to prevent the screen from looking dark when viewers look down the screen to watch televisions, the televisions are often used in the state that the optical center of the Fresnel lens is shifted by about 5 to 15% upward from the mechanical center of the Fresnel lens. Accordingly, in some cases, on account of the restriction imposed at the time of the manufacture of Fresnel lenses, the optical center of the Fresnel lens is brought into agreement with the mechanical center at the time of the manufacture of the Fresnel lens and the optical center of the Fresnel lens is shifted at the next step of cutting. Even in such cases, in order to make the vertical lenticular lens (having weak vertical diffusion properties at the middle portion compared with the upper and lower portions) always present above and below the mechanical center of the screen, the extent of the middle portion of the screen may preferably be within a range of 15% in the height direction from the mechanical center of the Fresnel lens.

Thus, the employment of the rear-projection screen according to the present invention makes it possible to more decrease the rainbows than the conventional screens.

Thirdly, when the screen of the present invention is used, color shift can be better prevented. The color shift is a phenomenon which may occur in three-tube rear-projection type televisions, three-panel rear-projection type televisions or the like because the incident angles of the respective monochromatic light rays (red, green and blue) incident on the screen are not equal to each other (i.e., have angular differences commonly called convergent angles), where the screen looks different in color when the viewers's point is changed right and left from the center of the screen. The color shift is variable in its character, depending on the shape and light diffusion properties of the light-diffusing member such as the lenticular lens which diffuses light in the horizontal direction. When lenticular lenses have the same shape, the respective monochromatic light rays can be more greatly diffused as the lenticular lens has greater light diffusion properties originating from the component materials, and hence the differences in light intensity of the monochromatic light rays can be made smaller, so that the color shift can be decreased. As previously described, since in the rear-projection screen of the present invention the light-diffusing fine particles can be incorporated in the light-diffusing member such as the lenticular lens in a higher concentration, the color shift can be more decreased than the conventional screens.

EXAMPLE 1

The Fresnel lens having the structure as shown in FIG. 2 was produced by ultraviolet resin curing. More specifically, an acrylic resin plate of 2 mm thick, its one side being to serve as a vertical lenticular lens surface and the other side being a flat surface, was formed by T-die extrusion. In this case, a molten resin extruded from a T-die was held between two rolls and shaped into the plate. On one of these rolls used, a pattern having a negative shape of a vertical lenticular lens having a constant hill pitch of 100 µm and a constant lens depth of 5 µm was engraved. In order to make the height of hills of the vertical lenticular lens greater at the upper and lower end portions than at the middle portion, the quantity of the molten resin was so controlled that its bank decreased at the middle portion of the roll and increases toward the outsides in the direction of roll width.

Thus, a Fresnel lens substrate with a one-side vertical lenticular lens was obtained which was 2.0 mm in total thickness, 100 µm in pitch ($P_1$) of the vertical lenticular lens, 3.0 µm in height ($h_1$) of hills of the vertical lenticular lens at its center in the width direction, and 5.0 µm in height ($h_2$) of hills of the vertical lenticular lens at a position of 280 mm from its center in the width direction.

Next, a lens mold having a Fresnel lens focal distance f of 700 mm was prepared, and an ultraviolet curable resin was casted into this lens mold. On the resin thus casted, the Fresnel lens substrate obtained in the above way was superposed, followed by conventional procedure to produce a Fresnel lens.

Meanwhile, the Fresnel lens having the structure as shown by reference numeral 4 in FIG. 1 was produced by extrusion. More specifically, as the resin to form the lens, polymethyl methacrylate was used. In this resin, inorganic light-diffusing fine particles having an average particle diameter of 20 µm and a difference in refractive index from polymethyl methacrylate, of 0.066 was incorporated in an amount of 4.0% by weight.

Thus, a lenticular lens sheet of 0.9 mm in lenticular lens pitch and 1.12 mm in total thickness was obtained.

Using the above Fresnel lens and lenticular lens sheet in combination, a rear-projection screen (width: 900 mm; height: 650 mm) was made up. At a position of 700 mm backward this screen, a green-picture CRT and a projection lens were placed. At a position of 11° in the horizontal direction, red- and blue-picture CRTs and projection lenses were placed, where a white picture was projected on the screen to view the picture. As the result, the peak gain of the screen was 6.0. When the picture was viewed at a distance of 3 m from the center of the screen, the outside rainbow 13-b as shown in FIG. 6 was not seen, and the inside rainbow 13-a was slightly seen at a position 220 mm outside the center.

Brightness at a position Q of 90% in the diagonal directions from the center of the screen and the brightness at the center P of the screen were measured to take the ratio (peripheral brightness ratio) of the both, which was found to be 12%. Intensity of red monochromatic light and intensity of blue monochromatic light at the point P were also measured while changing the visual angle in the horizontal direction, and, after the measurements were normalized with the brightness at a 0° visual angle of each monochromatic light, the ratio of the intensity of red monochromatic light to that of blue monochromatic light was found. The logarithm of the resulting intensity ratio was multiplied by 20 to indicate the value in decibel, and the maximum value of absolute values thereof was regarded as the maximum value of color shift. In this screen, the maximum value of color shift was 3 dB.

Comparative Example 1

A Fresnel lens substrate was prepared in the same manner as in Example 1 except that the quantity of the bank applied when the Fresnel lens substrate was prepared was controlled so as to be uniform in the direction of roll width.

Thus, a Fresnel lens substrate with a one-side vertical lenticular lens was obtained which was 2.0 mm in total thickness, 100 µm in pitch ($P_1$) of the vertical lenticular lens, and 5.0 µm in height of hills at every position in the width direction. To the Fresnel lens substrate thus obtained, the same procedure as in Example 1 was applied to produce a Fresnel lens.

Meanwhile, a lenticular lens was produced in the same manner as in Example 1 except that the light-diffusing fine particles incorporated in the lenticular lens were used in an amount of 2.5% by weight. Using the Fresnel lens and lenticular lens sheet thus obtained, a rear-projection screen was made up and a white picture projected on the screen was viewed, in the same manner as in Example 1. As the result, the peak gain of the screen was 6.0. When the picture was viewed at a distance of 3 m from the center of the screen, both the outside rainbow 13-b and the inside rainbow 13-a as shown in FIG. 6 were slightly seen.

The ratio of the brightness at a position Q of 90% in the diagonal directions from the center of the screen to the brightness at the center P of the screen was found to be 9.5%, where the screen looked dark at its border. The maximum value of color shift was 7.5 dB, where the color tone greatly turned red or blue when the picture was viewed while shifting eyes in the horizontal direction of the screen.

EXAMPLE 2

The Fresnel lens having the structure as shown in FIG. 2 was produced by pressing. More specifically, on a mirror-finished copper plate, a pattern having a negative shape of a vertical lenticular lens was engraved while keeping cut depth constant, and linearly increasing cutting pitch so as to be 50 µm in lens pitch ($P_3$) at the center and 7.5 µm in lens pitch ($P_4$) at a position of 280 mm in the direction perpendicular to the cutting direction.

Thus, a vertical lenticular lens mold was obtained which was 2.2 μm in height ($h_3$) of hills of the vertical lenticular lens at its center, and 5 μm in height ($h_4$) of hills of the vertical lenticular lens in the direction perpendicular to the cutting direction.

As a Fresnel lens mold for the press molding, a lens pattern having a Fresnel lens focal distance f of 700 mm was cut on a mirror-finished brass plate to obtain a Fresnel lens mold. These molds were fitted to a press molding machine as its top surface and bottom surface, and an acrylic resin plate was pressed between them by a conventional method to produce a Fresnel lens.

Thus, a Fresnel lens was obtained which was 2.0 mm in total thickness, 50 μm in pitch ($P_3$) of the vertical lenticular lens at its center, 2.2 μm in height ($h_3$) of hills, 75 μm in pitch ($P_4$) at a position of 280 mm from its center, and 5.0 μm in height ($h_4$) of hills.

Meanwhile, a lenticular lens was produced in the same manner as in Example 1 except that the light-diffusing fine particles incorporated in the lenticular lens were used in an amount of 4.8% by weight. Using the Fresnel lens and lenticular lens sheet thus obtained, a rear-projection screen was made up and a white picture projected on the screen was viewed, in the same manner as in Example 1. As the result, the peak gain of the screen was 6.0. When the picture was viewed at a distance of 3 m from the center of the screen, the outside rainbow 13-b as shown in FIG. 6 was not seen, and the inside rainbow 13-a was slightly seen. The ratio of the brightness at a position Q of 90% in the diagonal directions from the center of the screen to the brightness at the center P of the screen was found to be 13.5%. The maximum value of color shift was 2.0 dB.

Comparative Example 2

A Fresnel lens was prepared in the same manner as in Example 2 except that when the Fresnel lens is prepared the mold used to form the surface on the side opposite to the Fresnel lens surface was replaced by a mirror-finished mold (a plain mold). Thus, a Fresnel lens was obtained which was 2.0 mm in total thickness and had a flat surface on the side opposite to the Fresnel lens surface (i.e. the back of the light-diffusing member).

Meanwhile, a lenticular lens was produced in the same manner as in Example 1 except that the light-diffusing fine particles incorporated in the lenticular lens were used in an amount of 6.0% by weight. Using the Fresnel lens and lenticular lens sheet thus obtained, a rear-projection screen was made up and a white picture projected on the screen was viewed, in the same manner as in Example 1. As the result, the peak gain of the screen was 6.0. When the picture was viewed at a distance of 3 m from the center of the screen, the outside rainbow 13-b as shown in FIG. 6 was clearly seen, and the inside rainbow 13-a was also clearly seen. The ratio of the brightness at a position Q of 90% in the diagonal directions from the center of the screen to the brightness at the center P of the screen was found to be 8.5%, where the screen looked dark at its border. The maximum value of color shift was 2.0 dB.

As is also clear from the foregoing Examples, the rear-projection screen of the present invention makes it possible to decrease the rainbows, improve the brightness at the border and make the color shift smaller, without causing a lowering of peak gain.

We claim:

1. A rear projection screen, said screen comprising:
a Fresnel lens structure, a first side of which is a first light-diffusing member, and a second side of which is a circular Fresnel lens surface, and
a second light-diffusing member wherein said second light-diffusing member is spaced apart from the circular Fresnel lens structure and is adjacent to the Fresnel lens surface of said Fresnel lens structure,
wherein said first light-diffusing member has vertical-light diffusion properties greater at its upper and lower end portions than at its middle portion.

2. The rear-projection screen according to claim 1, wherein the middle portion of said screen has an extent which is within 15% in the height direction from the mechanical center of the Fresnel lens of the rear-projection screen, and the upper and lower end portions each have an extent which is 70% outward in the height direction from the mechanical center of the Fresnel lens thereof.

3. The rear-projection screen according to claim 1 or 2, wherein light-diffusing fine particles as a means for diffusing light in the vertical direction are incorporated in said first light-diffusing member, and the concentration of the light-diffusing fine particles in said first light-diffusing member is higher at the upper and lower end portions than at the middle portion of the screen.

4. The rear-projection screen according to claim 1, wherein said first light-diffusing member is a vertical lenticular lens that diffuses light in the vertical direction, and said vertical lenticular lens has vertical-direction light diffusion properties greater at its upper and lower end portions than at its middle portion.

5. The rear-projection screen according to claim 4, wherein said vertical lenticular lens has a constant height of lens hills, and has a pitch of lens hills which is smaller at the upper and lower end portions than at the middle portion of the screen.

6. The rear-projection screen according to claim 4, wherein said vertical lenticular lens has a constant pitch of lens hills, and has a height of lens hills which is greater at the upper and lower end portions than at the middle portion of the screen.

7. The rear-projection screen according to claim 4, wherein said vertical lenticular lens has a pitch of lens hills which is smaller at the upper and lower end portions than at the middle portion of the screen, and has a height of lens hills which is greater at the upper and lower end portions than at the middle portion of the screen.

* * * * *